(12) United States Patent
Busch et al.

(10) Patent No.: US 8,612,431 B2
(45) Date of Patent: Dec. 17, 2013

(54) MULTI-PART RECORD SEARCHES

(75) Inventors: Michael Busch, San Jose, CA (US); Andreas Neumann, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/371,456

(22) Filed: Feb. 13, 2009

(65) Prior Publication Data
US 2010/0211562 A1 Aug. 19, 2010

(51) Int. Cl.
*G06F 17/30* (2006.01)

(52) U.S. Cl.
USPC ............ 707/730; 707/705; 707/722; 707/723

(58) Field of Classification Search
USPC .................................. 707/705, 722, 723, 730
See application file for complete search history.

(56) References Cited

U.S. PATENT DOCUMENTS

| | | | |
|---|---|---|---|
| 6,839,702 B1 | 1/2005 | Patel et al. | |
| 7,028,044 B2 | 4/2006 | Hollaar et al. | |
| 7,346,605 B1 * | 3/2008 | Hepworth et al. | ...................... 1/1 |
| 8,185,591 B1 * | 5/2012 | Lewis | ........................... 709/206 |
| 2002/0042784 A1 * | 4/2002 | Kerven et al. | .................... 706/12 |
| 2003/0050927 A1 * | 3/2003 | Hussam | ............. 707/5 |
| 2003/0146939 A1 * | 8/2003 | Petropoulos et al. | ......... 345/810 |
| 2004/0205514 A1 * | 10/2004 | Sommerer et al. | ......... 715/501.1 |
| 2004/0205631 A1 | 10/2004 | Keohane et al. | |
| 2005/0144241 A1 * | 6/2005 | Stata et al. | .................... 709/206 |
| 2006/0059138 A1 | 3/2006 | Milic-Frayling et al. | |
| 2006/0136812 A1 | 6/2006 | Jones et al. | |
| 2006/0136821 A1 | 6/2006 | Barabe et al. | |
| 2007/0074125 A1 * | 3/2007 | Platt et al. | ...................... 715/760 |
| 2007/0088687 A1 * | 4/2007 | Bromm et al. | ..................... 707/4 |
| 2007/0124672 A1 | 5/2007 | Cragun et al. | |
| 2007/0226204 A1 | 9/2007 | Feldman | |
| 2007/0250578 A1 * | 10/2007 | Hardy et al. | .................. 709/206 |
| 2007/0288256 A1 * | 12/2007 | Speier | ............................. 705/1 |
| 2008/0016164 A1 | 1/2008 | Chandra | |
| 2008/0046845 A1 | 2/2008 | Chandra | |
| 2008/0281813 A1 * | 11/2008 | Moody et al. | ..................... 707/5 |

(Continued)

FOREIGN PATENT DOCUMENTS

WO    2006094557    9/2006

OTHER PUBLICATIONS

Article entitled Google Down Today, Too, dated Nov. 22, 2005 by Lenssen.*

(Continued)

*Primary Examiner* — Mahesh Dwivedi

(74) *Attorney, Agent, or Firm* — Patterson & Sheridan, LLP

(57) ABSTRACT

A method and apparatus are provided for enhancing search results generated by a search engine. A graphical user interface may display search results, which may include at least one multi-part record comprising a plurality of independent documents. Upon receiving a selection of the multi-part record from the search results a detailed view of the record may be displayed. The detailed view of the record may include a listing of the multiple documents that form the record along with an indication of whether keywords from the search criteria are present in the documents. By providing an indication of exactly which documents of a multi-part record include keywords associated with a search, embodiments of the invention allow users to easily identify desired materials from a list of search results comprising the multipart record.

18 Claims, 6 Drawing Sheets

(56) References Cited

U.S. PATENT DOCUMENTS

| | | | | |
|---|---|---|---|---|
| 2008/0294602 A1* | 11/2008 | Permandla et al. | ............... | 707/3 |
| 2009/0006358 A1* | 1/2009 | Morris et al. | ............... | 707/5 |
| 2009/0037407 A1* | 2/2009 | Yang et al. | ............... | 707/5 |
| 2009/0150784 A1* | 6/2009 | Denney et al. | ............... | 715/722 |
| 2009/0234809 A1* | 9/2009 | Bluger et al. | ............... | 707/3 |
| 2010/0115396 A1* | 5/2010 | Byron et al. | ............... | 715/234 |
| 2010/0257159 A1* | 10/2010 | Uematsu et al. | ............... | 707/723 |
| 2012/0226760 A1* | 9/2012 | Lewis | ............... | 709/206 |

OTHER PUBLICATIONS

Book entitled "Google Hacks", published Aug. 3, 2006, by Dornfest et al.*

Article entitled "X1 Enterprise Client" issued to X1, copyright 2006.*

Book entitled "Windows XP Hacks" by Gralla, published Feb. 2005.*

Frontcover of Book entitled "Google Hacks", published Aug. 3, 2006, by Dornfest et al.*

Article entitled "Desktop Search Engines: An Exciting New Tool" by Freedman, copyright 2005.*

Article entitled "The Bloomba Personal Content Database" by Stata et al., dated 2004.*

Screenshot of "Copernic Desktop Search" issued to Copernik, dated Aug. 30, 2007.*

Article entitled "Search the Star Tribune Paid Archives", dated Jun. 12, 2008 by Star Tribune.*

Riccardo Albertoni et al., "Semantic Web and Information Visualization", Proceedings of the 1st Italian Workshop on Semantic Web Application and Perspective, DEIT, p. 108-114, Ancona, Italy, Dec. 10, 2004. Available at http://semanticweb.deit.univpm.it/swap2004/cameraready/albertoni.pdf.

* cited by examiner

| Date | From | To | Subject | MP |
|---|---|---|---|---|
| 1/2/2008 | John Stewart | James Edwards | USPTO holidays — 371<br>The United States Patent and Trademark Office will be closed from.... | |
| 1/3/2008 | Ajay Sood | Phil Tucker | Application past due — 372<br>Do you have an update from the inventors for this on the patent application due... | |
| 1/4/2008 | Tyler Epstein | Liv McCarthy | Diligence project — 373<br>Please include the attached patents to your search list for.... | ✓ — 361 |
| 1/5/2008 | Jim Steele | Elizabeth Evans | Hydrogen powered car — 374<br>I would like to patent this invention before the bar date | |
| 1/6/2008 | Tim Hanks | Brad Cruise | IP litigation — 375<br>Here are the updates on the most recent patent lawsuits that.... | |

300

351 – 352 – 353 – 354 – 355 (rows)
310 Date, 320 From, 330 To, 340 Subject, 350 MP

FIG. 3

MULTI-PART RECORD SEARCHES

BACKGROUND OF THE INVENTION

1. Field of the Invention

The present invention is generally related to data processing, and more specifically to enhancing search results generated by a search engine.

2. Description of the Related Art

Modern computer systems generally have access to large amounts of data stored in a memory of the computer system or on other linked computer systems. Retrieving desired data from the vast amount of available data may generally involve using applications known as search engines. A search engine is generally capable of receiving requests for desired data, retrieving the desired data from one or more locations within the computer system or in other linked computer systems, and providing the desired data to a requesting entity.

A wide variety of different search engines exist today. For example, search engines are used in electronic mail (email) client applications to allow users to retrieve desired emails from an email box that may contain several thousands of emails. Web based search engines are used to retrieve desired web content from the Internet. A database search engine may be used to retrieve data from a database containing data organized using relational techniques.

SUMMARY OF THE INVENTION

The present invention is generally related to data processing, and more specifically to enhancing search results generated by a search engine.

One embodiment of the invention provides a computer-implemented method for displaying search results responsive to a search request which includes one or more keywords. The method generally comprises displaying, on a graphical user interface (GUI) screen, a list of search results, wherein the list includes at least one entry referencing a multi-part record, the multi-part record comprising a plurality of independent documents having a predefined association. The method further comprises displaying a detailed view of the multi-part record in the GUI screen upon receiving a selection of the multi-part record, wherein the detailed view comprises a list of the plurality of independent documents, and indicating whether one or more of the plurality of independent documents include at least one keyword used to identify the search results.

Another embodiment of the invention provides a computer readable storage medium comprising a program product which, when executed by a processor, is configured to perform an operation for displaying search results responsive to a search request which includes one or more keywords. The operation generally comprises displaying, on a graphical user interface (GUI) screen, a list of search results, wherein the list includes at least one entry referencing a multi-part record, the multi part record comprising a plurality of independent documents having a predefined association. The operation further comprises displaying a detailed view of the multi-part record in the GUI screen upon receiving a selection of the multi-part record, wherein the detailed view comprises a list of the plurality of independent documents, and indicating whether one or more of the plurality of independent documents include at least one keyword used to identify the search results.

Yet another embodiment of the invention provides a system generally comprising a memory comprising a program and at least one processor. When executing the program the processor is configured to display, on a graphical user interface (GUI) screen, a list of search results, wherein the list includes at least one entry referencing a multi-part record, the multi part record comprising a plurality of independent documents having a predefined association. Upon receiving a selection of the multi-part record, the processor is configured to display a detailed view of the multi-part record in the GUI screen, wherein the detailed view comprises a list of the plurality of independent documents, and indicate whether one or more of the plurality of independent documents include at least one keyword used to identify the search results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates another exemplary graphical user interface (GUI) screen comprising search results, according to an embodiment of the invention.

DETAILED DESCRIPTION OF THE PREFERRED EMBODIMENTS

Figure 1:
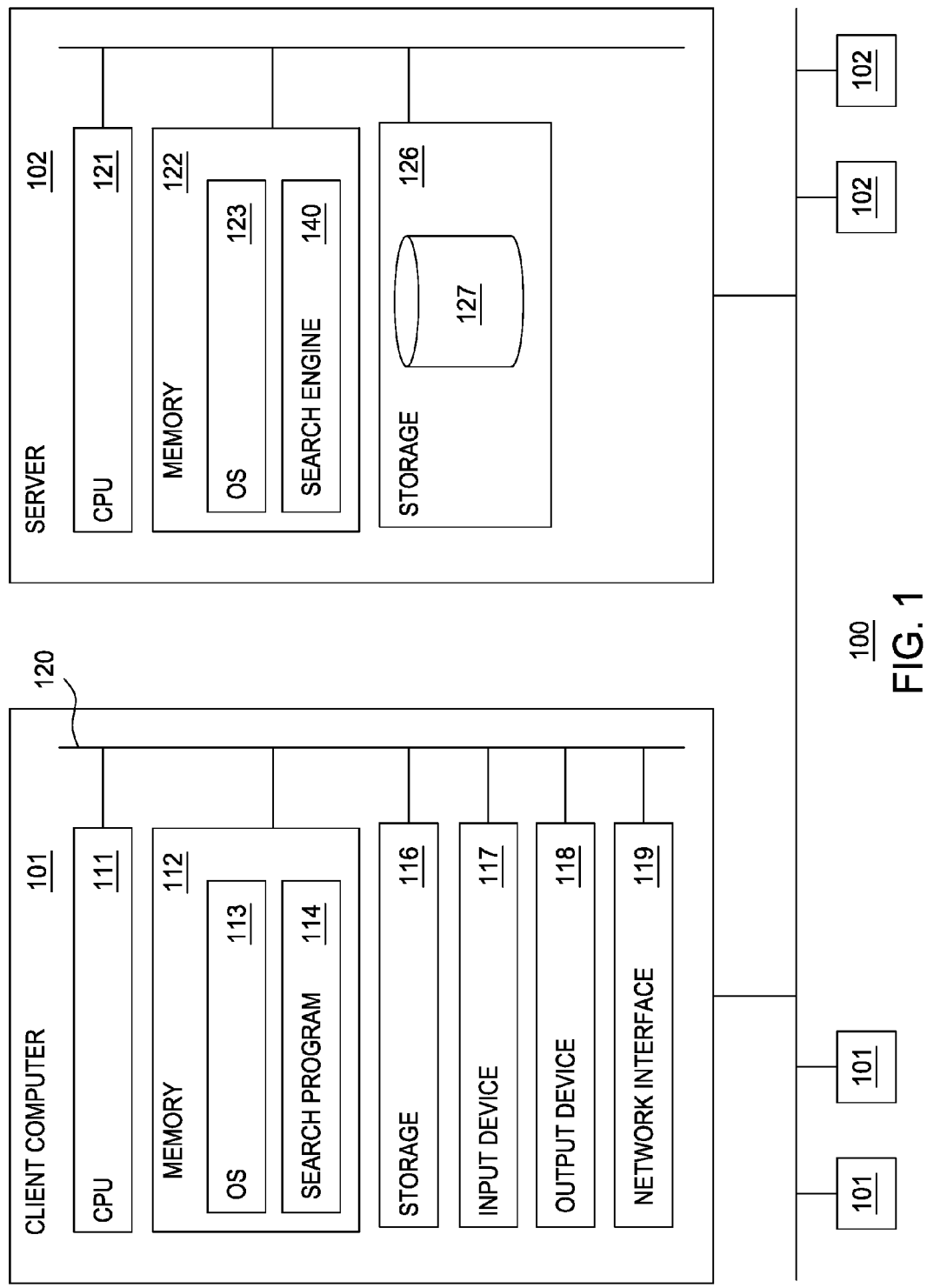
FIG. 1 illustrates an exemplary system according to an embodiment of the invention.

The present invention is generally related to data processing, and more specifically to enhancing search results generated by a search engine. A graphical user interface may display search results, which may include at least one multi-part record comprising a plurality of documents. Upon receiving a selection of the multi-part record from the search results a detailed view of the record may be displayed. The detailed view of the record may include a listing of the multiple documents that form the record along with an indication of whether keywords from the search criteria are present in the documents.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a networked system 100 in which embodiments of the invention may be implemented. In general, the networked system 100 includes a client (e.g., user's) computer 101 (three such client computers 101 are shown) and at least one server 102 (three such servers 102 shown). The client computers 101 and servers 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, track-ball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a search program 114 which, when executed by CPU 111, provides support for retrieving data from a server 102. In one embodiment, the search program 114 may include a web-based Graphical User Interface (GUI), which allows the user to display Hyper Text Markup Language (HTML) information. The GUI may be configured to allow a user to enter criteria for a search, transfer the search criteria to a server 102, and display results of the search. More generally, however, the search program 114 may be any GUI-based program capable of rendering any information transferred between the client computer 101 and the server 102.

In one embodiment of the invention, the search program 114 may be a web browser. Accordingly, a user may be allowed to enter search criteria such as, for example, keywords for desired web content in a GUI generated by the search program 114. In another embodiment, the search program 114 may be a query program configured to receive a query written in a high-level query language such as, for example, the Structured Query Language (SQL). In yet another embodiment, the search program 114 may be an email client configured to receive keywords for desired email content. Embodiments of the invention are not limited to the examples provided above. More generally, the search program 114 may be any program configured to receive search criteria for any type of content, and in some cases, display results of a search.

The server 102 may be physically arranged in a manner similar to the client computer 101. Accordingly, the server 102 is shown generally comprising at least one CPU 121, memory 122, and a storage device 126, coupled with one another by a bus 130. Memory 122 may be a random access memory sufficiently large to hold the necessary programming and data structures that are located on server 102. The server 102 may generally be under the control of an operating system 123 shown residing in memory 122. Examples of the operating system 123 include IBM OS/400®, UNIX, Microsoft Windows®, and the like. More generally, any operating system capable of supporting the functions described herein may be used.

The memory 122 further includes a search engine 140, as illustrated in FIG. 1. The search engine 140 may be a software product comprising a plurality of instructions that are resident at various times in various memory and storage devices in the computer system 100. When read and executed by a processor 121 in the server 102, the search engine 140 causes the computer system 100 to perform the steps necessary to execute steps or elements embodying the various aspects of the invention.

In one embodiment of the invention, the search engine 140 may be invoked when search criteria are transferred from the client computer 101 via the network 140. In response to receiving search criteria, the search engine 140 may retrieve data relevant to the search criteria from a memory location or storage device 126 in the server 102. In one embodiment of the invention, the storage device 126 may include a database 127, from which data relevant to search criteria is retrieved by the search engine 140. The database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment of the invention, in response to receiving search criteria from the client computer 101, the search engine 140 may be configured to access one or more other servers 102 for data relevant to the search criteria. For example, in one embodiment, the server 102 may be a web server comprising an index of web content. The index of web content may identify one or more servers 102 in which particular web content is stored. Accordingly, in one embodiment, upon receiving search criteria from the client computer 101, the search engine 140 may identify the servers 102 in which web content related to the search criteria is located using the index. Thereafter, the search engine 140 may retrieve desired web content from the identified servers 102.

In one embodiment of the invention, the server 102 may be an email server configured to store and manage emails. Accordingly, the database 127 in storage device 126 may be an email database configured to store emails, metadata associated with the emails, email attachments, and the like. In some embodiments, upon receiving search criteria from the client computer 101, the search engine 140 may be configured to access the email database 127 to retrieve emails and associated metadata and/or documents relevant to the search criteria.

While FIG. 1 illustrates a networked system 100 comprising client computers and servers, embodiments of the invention are not limited to the client server model. More generally, any reasonable arrangement of computers and arrangement of applications 114 and 140 within the computers falls within the purview of the invention. For example, in an alternative embodiment, the search engine 140 may be provided within a client computer 101, for example, within memory 112. In this embodiment, search criteria may be transferred from the search program 114 in the client computer 101 to the search engine 140 within the client computer 101. In response to receiving the search criteria, the search program 140 within the client computer 1010 may be configured to retrieve data relevant to the search criteria from memory and storage locations within the client computer 101 and/or one or more servers 102.

Results retrieved by the search engine 140 may be transferred to the search program 114, which may in turn provide the search results to a requesting entity. For example, search results of a web search may be provided by the search engine 140 to the search program 114. Upon receiving the search results, the search program 114 may display the search results to a user by means of a GUI.

In one embodiment of the invention, the search engine 140 may be configured to enhance the search results provided to the requesting entity. For example, in some embodiments, when the search criteria include keywords, the search engine 140 may be configured to identify portions of each record in the results which contain the keywords. The identified portions may be displayed by the search program 114 in, for example, a GUI displaying the search results. In some embodiments, the keywords may be identified using one or more text effects in the displayed portions so that a user viewing the search results can easily locate the keywords and determine whether a more detailed viewing of the record is desired.

Figure 2:
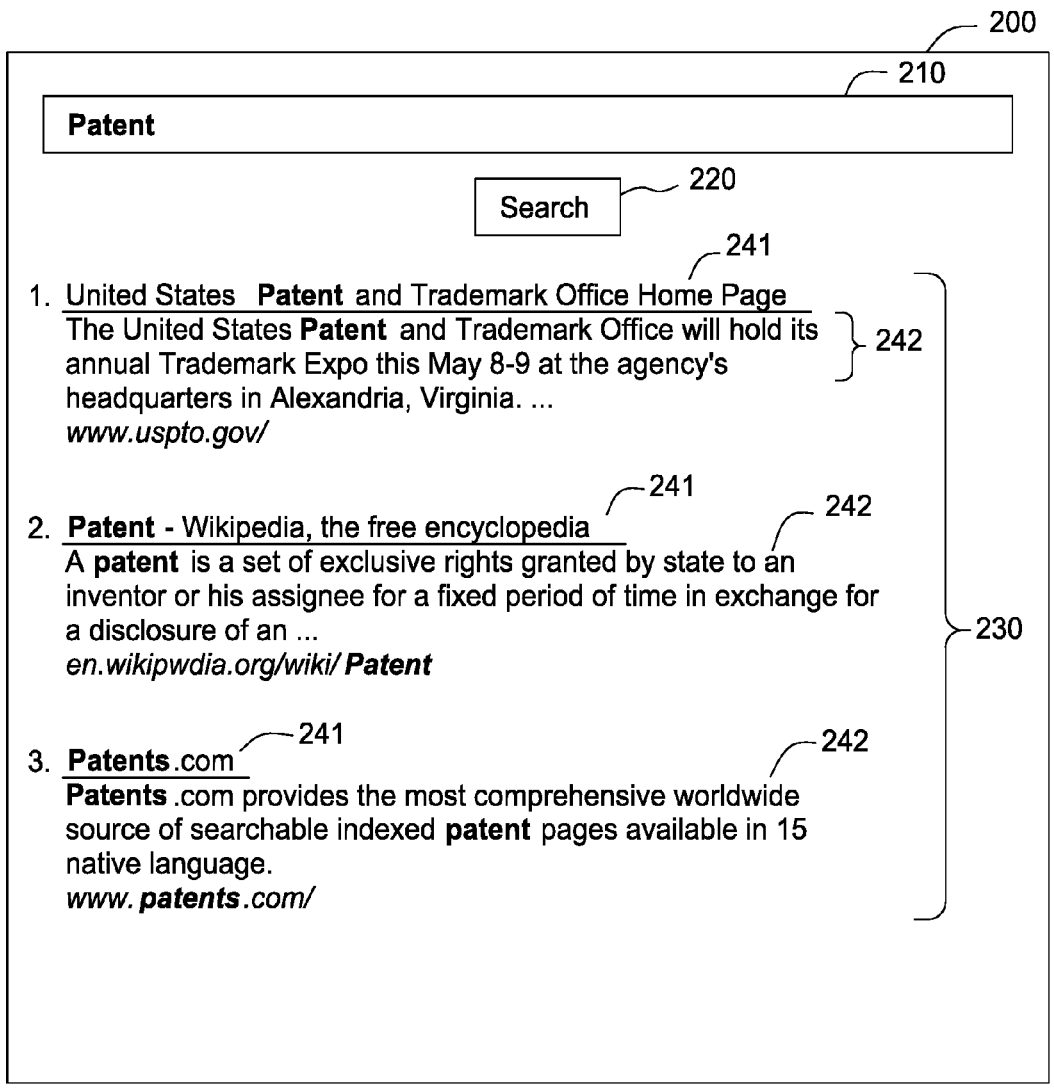
FIG. 2 illustrates an exemplary graphical user interface (GUI) screen comprising search results, according to an embodiment of the invention.

FIG. 2 illustrates an exemplary GUI 200 comprising enhanced search results according to an embodiment of the invention. As illustrated in FIG. 2, the GUI 200 may include a text box 210 and a search button 220. The text box 210 may be used to enter search criteria. For example, in a web browser, the text box 210 may be used to enter keywords to search for desired web content. Alternatively, in an email client, the text box 210 may be used to enter keywords to search for emails containing the keywords. While a text box 210 is illustrated, in alternative embodiments, any other graphical tool including, for example, drop down menus, buttons, check boxes, or the like may be used to enter search criteria.

After the search criteria is entered in the text box 210, the search button 220 may be pressed to begin the search. In one embodiment of the invention, pressing the search button 220 may cause the search program 114 to transfer the search criteria to the search engine 140. The search engine may conduct the search to retrieve search results, and transfer the search results back to the search program 114, which may display the search results in the GUI 200. For example, exemplary search results 230 for the keyword "patent" are illustrated in FIG. 2. For the purposes of this example, the search results are shown as web content. However, in alternative embodiments, any other type of content, for example, emails may also be retrieved.

As illustrated in FIG. 2, the search results may include a plurality of records. For example, three records are shown in FIG. 2. In one embodiment of the invention, the search results 230 may include a link 241 for each of the records. Each link 241 may include text that describes the search record. For example, the title of the record, name of the owner, or any other reasonable metadata describing the record may be displayed as a link. In FIG. 2, for example, the links 241 include a name of a web site. Clicking a link 241 may result in a more detailed view of the record being displayed to the user. For example, in FIG. 2, clicking a link may result in a respective web page being displayed to the user. In some embodiments, placing a screen pointer, for example, a mouse or stylus pen over the link may result in a preview screen with a more detailed portion of the record being displayed to the user.

In some embodiments, the search results 230 may also include portions of records that include keywords from the search criteria. The portions of the search record that include keywords from the search criteria are referred to herein as extracts. For example, FIG. 2 illustrates extracts 242 for each record in the search results 230 including the keyword used for the search (in this case, "patent"). The extracts 242 may be provided to allow a user to make a better determination as to which of the search records is more desirable for more detailed viewing.

An extract may include one or more text sections that are extracted from a text content of a document. In some embodiment, the extract may include a summary that is compiled from various text sections of a document. In general, an extract may be a short section of text that is derived from text within a document. The extracts may be configured to give a user a hint as to the content of the document. For example, in a particular embodiment, the extract may include one or more sentences from the document that contain one or more keywords from the search criteria.

In some embodiments, the keywords in the extracts 242 may be enhanced with one or more text effects to make them easier to locate within the extracts. For example, in FIG. 2, the word patent is displayed in bold face to make it more visible than surrounding text. While bold facing is described herein, any other text effect, for example, highlighting, different fonts, italicizing, or the like may be used to make the keywords stand out in the portions 242.

In some embodiments, one or more data records displayed in the search results 230 may include a collection of a plurality of independent and distinct documents. Such data records are referred to herein as multi-part records. One example of a multi-part record is a zip folder that may contain a plurality of compressed documents. Another example of a multi-part document may be an email having one or more attachments. The attachments and the body of the email along with metadata associated with the email may each represent individual parts of the multipart email record. Yet another example of a multi-part record may be a website having a plurality of linked web pages, wherein each web page forms an independent document of the multi-part record. The above examples are provided herein for illustrative purposes only and do not limit the scope of multi-part records as described herein. More generally, a multi-part record may include a plurality of independent and distinct documents that have a predefined association with one another.

When search results 230 include a multi-part record, the extracts 242 may be derived from any one of the multiple documents of the multi-part record. For example, in an email search for the keyword "patent", the search results may include an email with a first, second and third attachment. The third attachment may include the keyword "patent". Accordingly, an extract from the third attachment may be provided along with a link to the email in the search results 230. A user may access a more detailed view of the third attachment by selecting the email from the search results 230 and selecting the third attachment.

It is possible that a multipart record in the search results 230 may include a large number of documents. In such cases, a user may find it difficult to identify the particular document from which an extract is provided in the search results 230. Therefore, in one embodiment of the invention, particular documents in the multi-part record that contain relevant keywords may be displayed to the user upon selection of the multi-part record.

FIG. 3 another exemplary set of search results 300 generated by a search engine, according to an embodiment. For the purposes of this example, it is assumed that an email search is performed for the keyword 'patent'. As illustrated in FIG. 3, five records 351-355 are found for the keyword 'patent'. For purposes of illustration, the search results 300 are shown as results of an email search. Accordingly, the search results are shown comprising a plurality of columns illustrating metadata for emails that are included in the search results. Exemplary columns illustrated in FIG. 3 include, for example, a 'Date' column 310, a 'From' column 320, a 'To' Column 330, and a 'Subject' column 340, as illustrated in FIG. 3.

In one embodiment, a further column 360 may be included to indicate whether a particular record in the search results is a multi-part record. For example, the check mark 361 in column 360 may indicate that the record 353 is a multi-part document. While a tabulated result set 300 is shown in FIG. 3, embodiments of the invention are not limited only to displaying results in tabular form. In alternative embodiments, the search results may be shown as a list (as in FIG. 2), or any other graphical form.

As illustrated in FIG. 3, the results 351-355 may also include respective extracts 371-375 associated therewith. The extracts may include one or more keywords that formed a part of the search criteria, for example, in this case, the keyword 'patent'. The keywords may be enhanced with one or more text effects. For example, the keyword patent is shown in bold faced font in the extracts. As described above, the extracts 371-375 may be derived from the record or any document that forms a part of a multi-part record.

Figure 4:
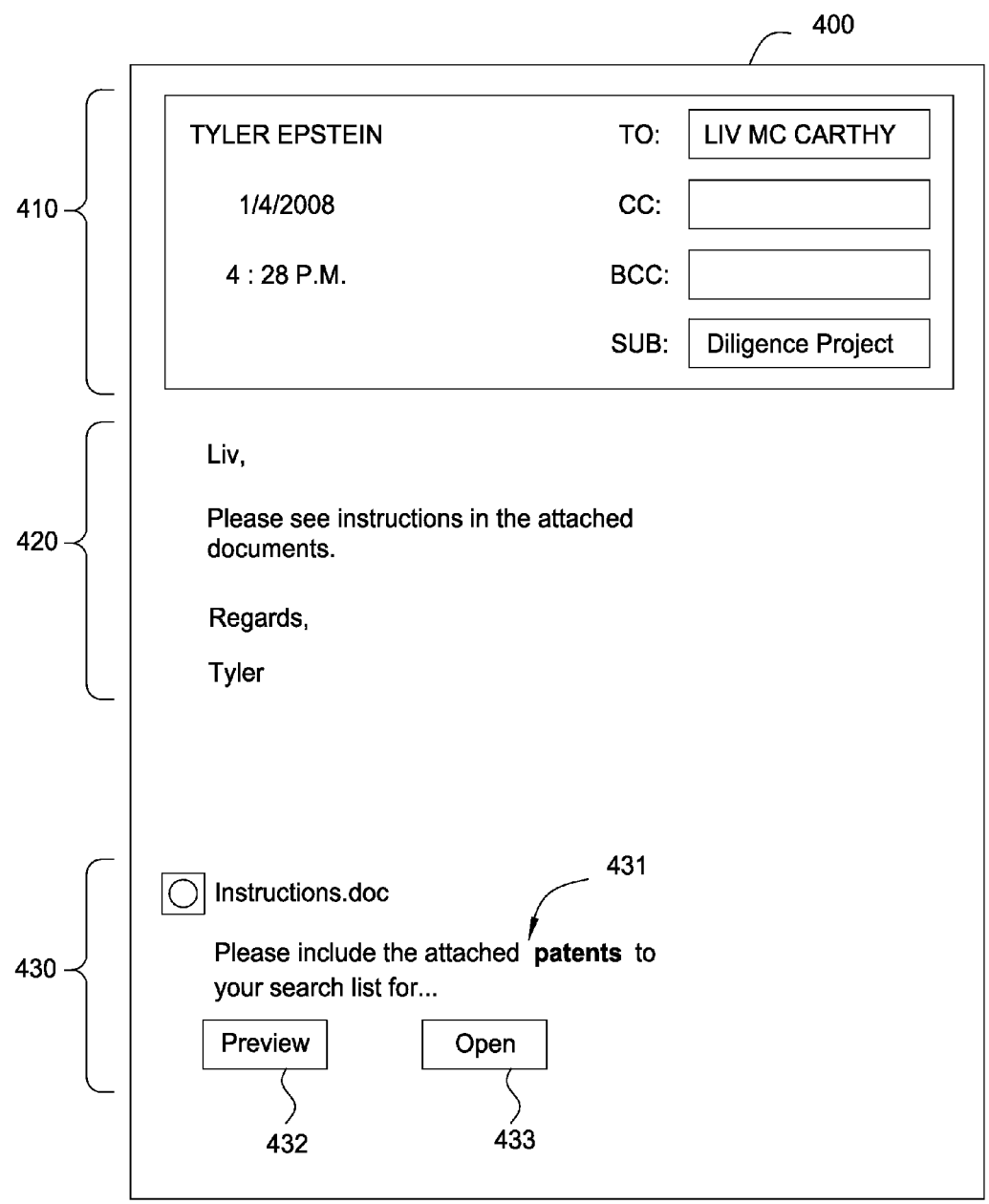
FIG. 4 illustrates a GUI screen displaying a detailed view of a search results according to an embodiment of the invention.

Selecting any one of the search records 351-355 using a screen pointer may cause a detailed view of the record to be displayed. FIG. 4 is an exemplary GUI 400 that illustrates a detailed view of the record 353 shown in FIG. 3. As illustrated in FIG. 4, the GUI 400 may include metadata 410 describing the record 353, a body section 420, and in the case of multi-part records, a list 430 of one or more documents of the multi-part record that include keywords that were included in the search criteria.

The metadata section 410 may include data describing one or more characteristics of the record. For example, in the case of emails, the metadata may include, for example, the name of the sender, names of the recipients, date and time at which the email was sent or received, subject of the email, and the like, as illustrated in FIG. 4. The metadata section may be optional, and can be excluded in some embodiments. For example, a metadata section may not be necessary when displaying a detailed view of web content retrieved in a web search.

The body 420 may include, for example, a main text section that is included in the email, the content of a web page, content of a text document, or the like. In general, the body 420 may be a main text section of any type of a document or multi-part document. In one embodiment of the invention, if the body of the email contains keywords that were a part of the search criteria, the keywords in the body 420 may be enhanced using one or more text effects.

In the case of a multi-part document, the GUI 400 may also include at least a subset of documents that form a part of the multi-part record along with the combination of the body 420 and optional metadata 410. Specifically, one or more documents of the multi-part record that include keywords that were included in the search criteria may be displayed in the list 430. For example, FIG. 4 illustrates a single document "Instructions.doc" which may include the keyword "patent". In an alternative embodiment, all documents of the multi-part record may be displayed in the list 430. When all documents of the multi-part record are displayed, the documents containing the keywords may be graphically distinguished from the documents that do not contain the keywords. For example, the documents containing the keywords may be distinguished using text effects, icons, and the like.

In one embodiment of the invention, an extract 431 from the document "Instructions.doc" may be provided. The extract 431 may include one or more keywords used in the search criteria. For example, the extract 431 in FIG. 4 includes the word "patent", which may be enhanced using a text effect. While a single extract 431 is shown in FIG. 4 it is possible that the keywords may exist in multiple locations within a document. Accordingly, in some embodiments, multiple extracts 431 may be displayed.

FIG. 4 also illustrates a preview button 432 and an open button 433. The preview button 432 may cause a preview screen comprising a view of the text content of a document to be displayed. In some embodiments the preview screen may not include formatting such as, for example, text effects, special characters, new line characters, and the like. The text illustrated in the preview screen may however include text effects that identify keywords. If a user desires to view a document with its original formatting, the user may click the open button 433 to open the document. Opening the document may involve, for example, any combination of downloading the document and saving the document. In one embodiment, text illustrated in an opened document may also include text effects that identify keywords. Using the open button 433 to open the document may allow the user to perform functions such as editing, which may not be possible in a preview screen.

Figure 5:
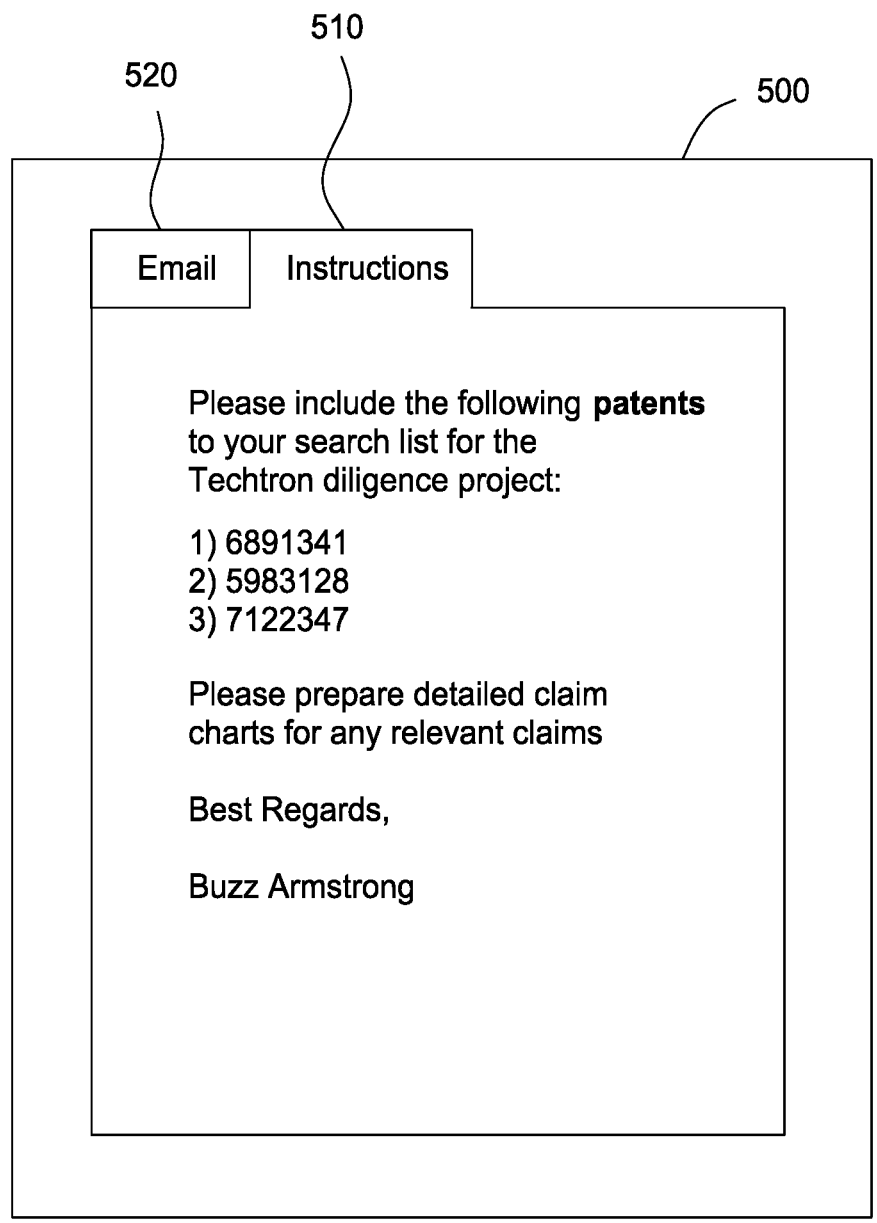
FIG. 5 illustrates an exemplary preview screen for displaying search results according to an embodiment of the invention.

FIG. 5 illustrates a preview screen 500 that may be displayed when the preview button 432 is clicked, according to an embodiment of the invention. As shown in FIG. 5, the preview screen 500 may display a more detailed view of a selected document (in this case "instructions.doc"). Keywords of the search criteria that are present in the document may be enhanced with a suitable text effect, as illustrated in FIG. 5.

Further, as shown in FIG. 5, the preview screen may include tabs 510 and 520 that may allow the user to navigate back to a view of the original email record and list of relevant documents. For example, clicking the email tab 520 may display the GUI 400 of FIG. 4, in one embodiment. Therefore, the user may be allowed to navigate back and forth from a document preview screen to the email screen while reviewing the search results.

While tabs are discussed herein as a means for displaying the contents of multiple parts of a multiple part document, embodiments of the invention are not limited only to tabs. In an alternative embodiment, a GUI screen may be provided with an explorer panel and a detailed view panel. The explorer panel may illustrate a collapsible list of the multiple parts of the multipart document. Upon selecting a document from the collapsible list, a detailed view of the document may be displayed in the detailed view panel. Selection of a document may also result in any sub-documents of the document being displayed in the collapsible list.

In one embodiment of the invention, documents in the collapsible list that contain keywords may be distinguished from documents in the collapsible list that do not contain keywords. For example, documents that contain keywords may be distinguished by means of highlighting, text effects, adjacent icons, and the like. Therefore a user may be able to easily identify documents that contain desired keywords from the collapsible list.

In some embodiments of the invention, the preview button 432 may be omitted. In such embodiments, a preview screen may be generated if a screen pointer is moved over a document in the list 430. In some embodiments, the open button 433 may be omitted, and the user may be able to open the document by simply clicking a link to the document in the list 430.

In one embodiment of the invention, the extracts 431 may be omitted in the list 430. Instead, the GUI screen 400 may display, for each keyword, a count indicating the number of times a particular keyword occurs in a given document. In some cases, the documents in the list may be ordered based on a term frequency of keywords occurring in the document. For example, documents having the greatest counts may be displayed on top of the list, as they may be more relevant to the user.

In some embodiments of the invention, one or more documents of a multi-part record may itself be a multi-part record. For example, an email may include, as an attachment, another email, which in turn may include one or more attachments. Accordingly, in one embodiment of the invention, the documents in list 430 in GUI 400 of FIG. 4 may be expandable and/or collapsible to either show or hide one or more documents that are associated therewith.

Figure 6:
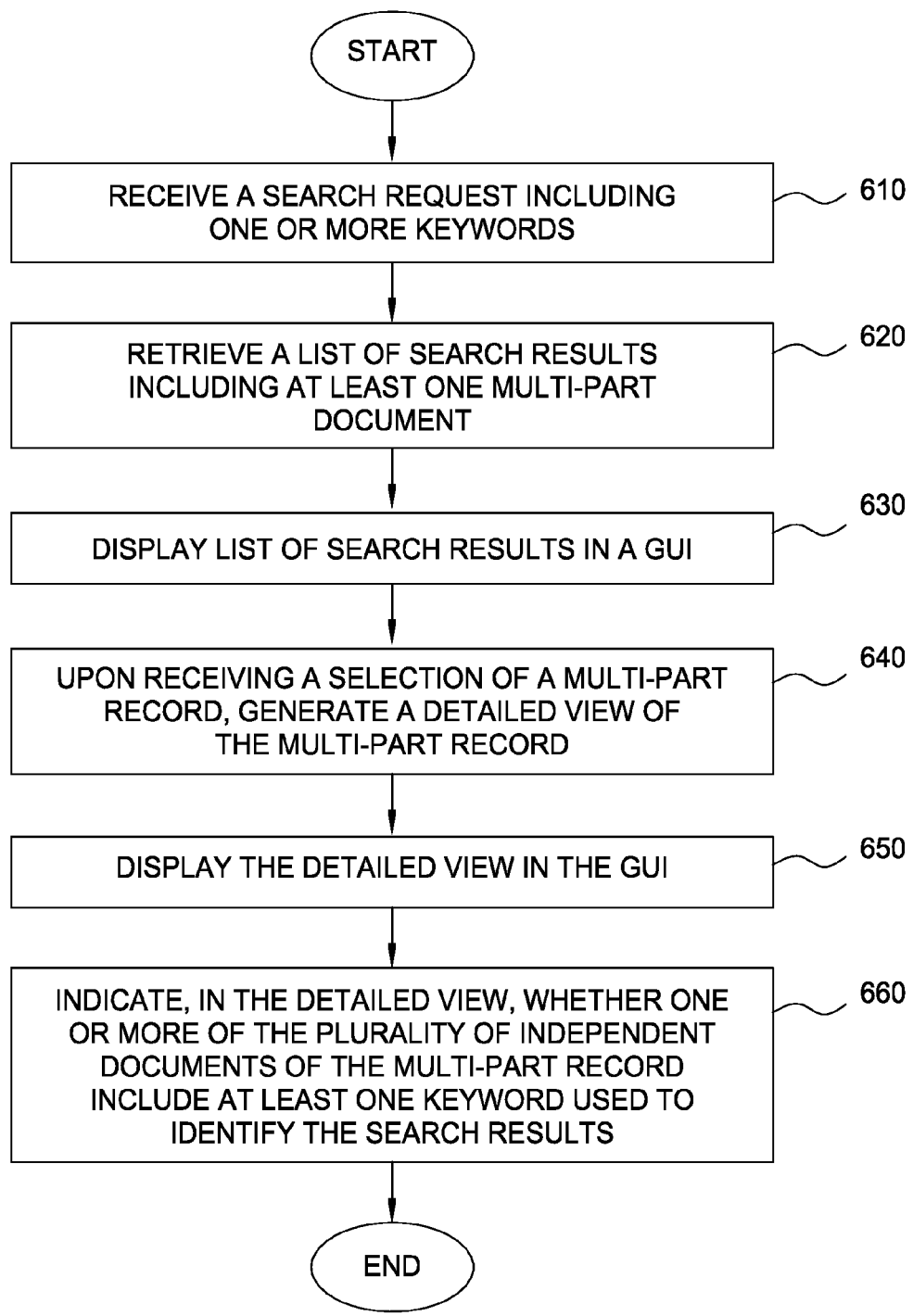
FIG. 6 is a flow diagram illustrating exemplary operations performed by a search engine according to an embodiment of the invention.

FIG. 6 is a flow diagram illustrating exemplary operations performed by a search engine 140 according to an embodiment of the invention. The operations may begin in step 610 by receiving a search request including one or more key words. In response to receiving the search request, the search engine 140 may retrieve a list of search results in step 620. In one embodiment of the invention, the list of search results may include at least one multi-part document. Each multi-part record may include a plurality of independent documents having a predefined association. In step 630, the search engine 140 may display the list of search results in a graphical user interface (GUI). For example, the search engine 140 may cause search program 114 to generate a GUI screen comprising the list of search results in an output device 118.

In step 640, the search engine 140 may generate a detailed view of the multi-part record upon receiving a selection of a multi-part record. In one embodiment of the invention, the detailed view may include a list of the plurality of independent documents. The generated view may be displayed in the GUI in step 650. In step 660, the search engine 140 may indicate, in the detailed view, whether one or more of the plurality of independent documents of the multi-part record includes at least one keyword used to identify the search results.

By providing an indication of exactly which documents of a multi-part record include keywords associated with a search, embodiments of the invention allow users to easily identify desired materials from a list of search results comprising the multipart record.

While the foregoing is directed to embodiments of the present invention, other and further embodiments of the invention may be devised without departing from the basic scope thereof, and the scope thereof is determined by the claims that follow.

What is claimed is:

1. A computer-implemented method for displaying search results responsive to a search request including at least one keyword, the method comprising:
 configuring one or more computer processors with a program to perform an operation comprising:
  outputting a graphical user interface (GUI) screen including a list of search results, wherein the list of search results includes at least one entry referencing a multi-part record, the multi-part record comprising a plurality of independent documents having a predefined association, and wherein the multi-part record is created prior to performing a search in response to the search request;

upon receiving a selection of the multi-part record, generating a detailed view of the multi-part record, wherein the detailed view includes a list of all of the plurality of independent documents, and wherein independent documents among the plurality are ordered in the list based on a frequency of the at least one keyword occurring;

outputting the generated view;

upon determining a mouse cursor is in proximity to a first one of the documents in the multi-part record, presenting a first preview of the first document in the multi-part record;

receiving a request to view via a click input of a button on the GUI a second preview of at least a second one of the plurality of independent documents in the multi-part record; and in response to the request, displaying the second preview, wherein the second preview includes an extract from the second one of the plurality of independent documents and a tab used to return to the list of search results, and wherein the extract includes the at least one keyword.

2. The method of claim 1, wherein the at least one keyword is enhanced using a text effect.

3. The method of claim 1, wherein the multi-part record is graphically distinguished in the list of search results from other records.

4. The method of claim 1, further comprising:
receiving a selection of an independent document among the plurality of independent documents; and
outputting a detailed view of the selected independent document.

5. The method of claim 4, wherein outputting a detailed view of the selected independent document comprises at least one of:
opening the selected independent document; and
outputting contents of the selected independent document in a preview screen.

6. The method of claim 1, wherein the multi-part record is one of (i) an e-mail comprising one or more attachments and (ii) a zip file.

7. The method of claim 1, wherein independent documents among the plurality that contain the at least one keyword are graphically distinguished in the detailed view from independent documents among the plurality that do not contain the at least one keyword.

8. The method of claim 1, wherein a count for each of the at least one keyword is displayed in the detailed view indicating a number of times that the keyword occurs in one or more of the plurality of independent documents.

9. A computer program product for displaying search results responsive to a search request including at least one keyword, the computer program product comprising a computer readable storage medium having computer usable program code configured for:
outputting, to a display device, a graphical user interface (GUI) screen including a list of search results, wherein the list of search results includes at least one entry referencing a multi-part record, the multi-part record comprising a plurality of independent documents having a predefined association, and wherein the multi-part record is created prior to performing a search in response to the search request;

upon receiving a selection of the multi-part record, generating a detailed view of the multi-part record, wherein the detailed view includes a list of all of the plurality of independent documents, and wherein independent documents among the plurality are ordered in the list based on a frequency of the at least one keyword occurring therein;

outputting the generated view;

upon determining a mouse cursor is in proximity to a first one of the documents in the multi-part record, presenting a first preview of the first document in the multi-part record;

receiving a request to view via a click input of a button on the GUI a second preview of at least a second one of the plurality of independent documents in the multi-part record; and in response to the request, displaying the second preview, wherein the second preview includes an extract from the second one of the plurality of independent documents and a tab used to return to the list of search results, and wherein the extract includes the at least one keyword.

10. The computer program product of claim 9, wherein the at least one keyword is enhanced using a text effect.

11. The computer program product of claim 9, wherein the multi-part record is graphically distinguished in the list of search results from other records.

12. The computer program product of claim 9, wherein the program code is further configured for receiving a selection of an independent document among the plurality of independent documents, and outputting a detailed view of the selected independent document by at least one of:
opening the selected independent document; and
outputting the selected independent document in a preview screen.

13. The computer program product of claim 9, wherein independent documents among the plurality that contain the at least one keyword are graphically distinguished in the detailed view from independent documents among the plurality that do not contain the at least one keyword.

14. A system, comprising:
a processor; and
a memory storing a program, which, when executed on the processor, performs an operation of displaying search results responsive to a search request including at least one keyword, the operation comprising:
outputting, on a graphical user interface (GUI) screen, a list of search results, wherein the list of search results includes at least one entry referencing a multi-part record, the multi part record comprising a plurality of independent documents having a predefined association, and wherein the multi-part record is created prior to performing a search in response to the search request, upon receiving a selection of the multi-part record, generating a detailed view of the multi-part record, wherein the detailed view includes a list of all of the plurality of independent documents, and wherein independent documents among the plurality are ordered in the list based on a frequency of the at least one keyword occurring therein, outputting the generated view, upon determining a mouse cursor is in proximity to a first one of the documents in the multi-part record, presenting a first preview of the first document in the multi-part record, receiving a request to view via a click input of a button on the GUI a second preview of at least a second one of the plurality of independent documents in the multi-part record; and in response to the request, displaying the second preview, wherein the second preview includes an extract from the second one of the plurality of independent documents and a tab used to return to the list of search results, and wherein the extract includes the at least one keyword.

15. The system of claim 14, wherein the at least one keyword is enhanced using a text effect.

16. The system of claim 14, wherein the multi-part record is graphically distinguished in the list of search results from other records.

17. The system of claim 14, wherein the operation further comprises receiving a selection of an independent document among the plurality of independent documents, and outputting a detailed view of the selected independent document by at least one of:

opening the selected independent document; and
outputting the selected independent document in a preview screen.

18. The system of claim 14, wherein independent documents among the plurality that contain the at least one keyword are graphically distinguished in the detailed view from independent documents among the plurality that do not contain the at least one keyword.

* * * * *